UNITED STATES PATENT OFFICE.

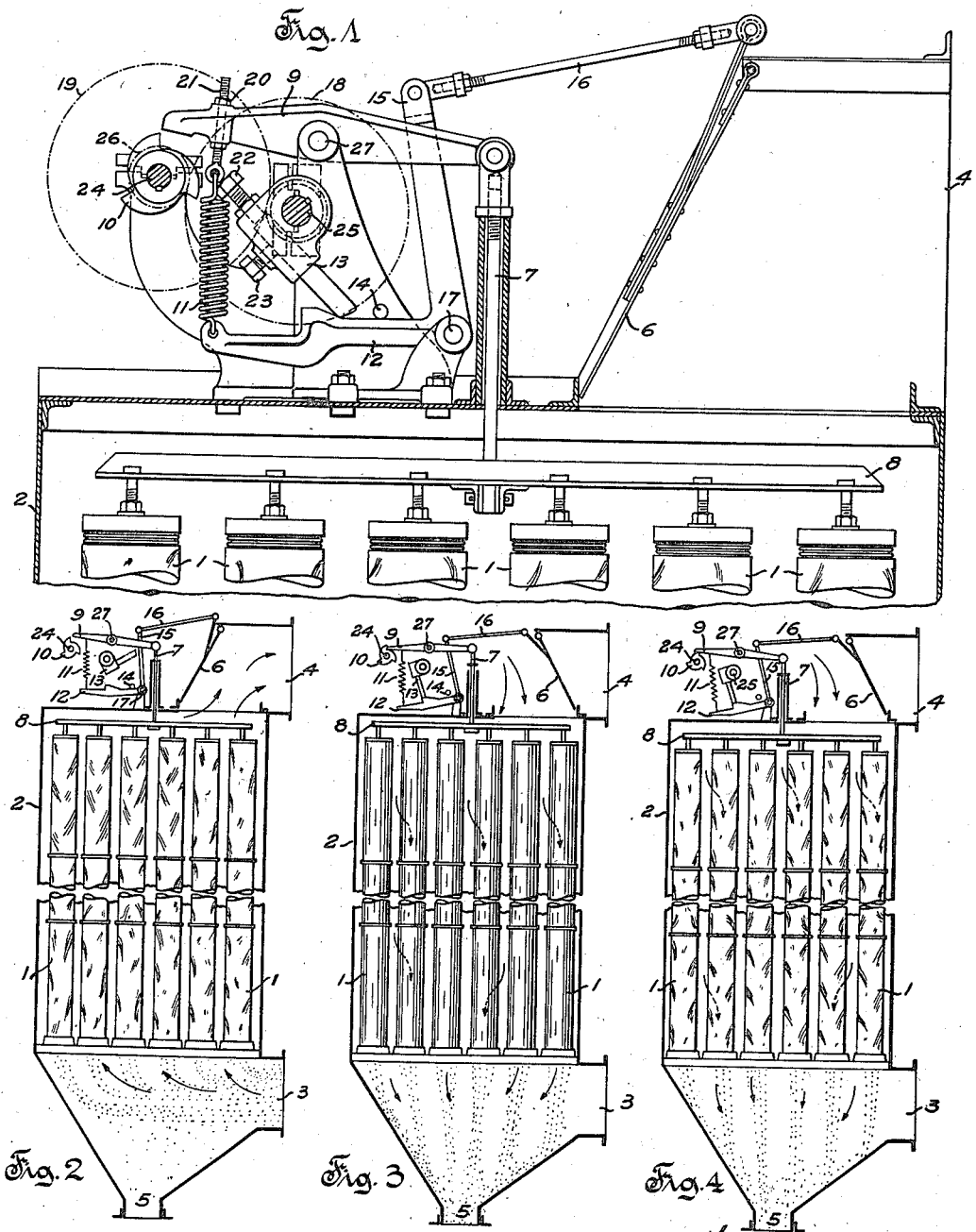

RAY C. NEWHOUSE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

METHOD OF AND APPARATUS FOR SEPARATING SOLIDS FROM GAS.

1,168,543.      Specification of Letters Patent.      Patented Jan. 18, 1916.

Application filed April 29, 1915. Serial No. 25,328.

*To all whom it may concern:*

Be it known that I, RAY C. NEWHOUSE, a citizen of the United States, residing at Milwaukee, in the county of Milwaukee and State of Wisconsin, has invented a certain new and useful Improvement in Methods of and Apparatus for Separating Solids from Gas, of which the following is a specification.

This invention relates to improvements in a method of and an apparatus for removing solids from gases, the invention being particularly applicable to that class of devices known as dust collectors.

An object of the invention is to provide a method of removing solids, such as dust, from a gas, such as air, which is simple and efficient in its operation.

Another object is to provide a simple and effective apparatus for carrying on the method.

It has heretofore been proposed, in the art of dust collecting, to remove the dust from the air by means of a plurality of filter bags made of fabric, and to clean the dust laden bags by periodically shaking the same by means of mechanical devices. In one form of device of the prior art, the dust was deposited upon the filter bags while the same were stretched, and was removed therefrom by a periodic gradual slackening or releasing of the stretched bags and a sudden restretching of the same. In this form of apparatus it was found to be impossible during the cleaning operation to remove the particles of dust which had lodged between the meshes of the stretched bags during the collecting period. An advance in the art was to permit the bags to remain in slacked position during the collecting operation and to periodically simultaneously reverse the flow of air through the filters and successively gradually stretch and suddenly release the bags in order to clean the same. While this form of apparatus facilitated cleaning of the bags, it has been found to be still more desirable to maintain the filter bags slackened during the collecting operation and to suddenly stretch and gradually release the bags during cleaning and while the flow of gas therethrough is being reversed. This latter method of operation, which is a feature of the present invention, embodies the good features of both of the above described methods of the prior art and eliminates the objectionable features thereof.

A clear conception of an embodiment of the invention may be had by referring to the drawing accompanying and forming a part of the specification in which like reference characters designate the same or similar parts in the various views.

Figure 1 is a fragmentary enlarged sectional view of a dust collector and the bag cleaning mechanism thereof. Fig. 2 is a diagrammatic fragmentary sectional view of a dust collector showing the filter bags slackened during the collecting operation. Fig. 3 is a diagrammatic fragmentary sectional view of a dust collector showing the filter bags stretched during the cleaning operation. Fig. 4 is a diagrammatic fragmentary sectional view of a dust collector showing the filter bags slackened during the cleaning operation.

The ordinary dust collector of the bag type comprises a number of inclosed compartments, each containing one or more filter bags, usually twelve in number. The compartments are all connected to a common inlet and discharge and their number depends upon the amount of air to be purified, and also upon the amount of dust normally contained in the air. In the drawing, only one compartment is shown and it will be understood that the remaining compartments are similar in construction and are successively arranged closely adjacent to the compartment disclosed.

The filter bags 1, which are preferably formed of a special fabric, are housed within a suitable casing 2, being suspended within said casing by means of suspension cross rods 8. The lower extremities of the bags are open, thus establishing free communication between the interior of the bags 1 and the lower portion of the casing 2. The casing 2 is provided with an inlet 3, and a dust discharge outlet 5 at the lower end thereof.

The chamber below the bags 1 is preferably made common to all compartments of the dust collector, and the inlet 3 is preferably so directed that the dust laden air, in order to enter the bags 1, must change its direction of flow abruptly so that the heavier particles of dust will be precipitated by gravity directly into the dust discharge 5 without first entering the bags 1.

The upper end of the casing 2 is provided with a discharge outlet 4 which communicates with a suitable suction apparatus, such as a fan, not shown, and communication between which and the interior of the casing 2 is controllable by means of a gate 6. With the gate 6 in the position shown in Figs. 1 and 2, the air discharge 4 communicates directly with the interior of the casing 2. With the gate 6 in the position shown in Figs. 3 and 4, the interior of the casing 2 communicates directly with the atmosphere.

The suspension crossrod 8 is connected by means of a vertically disposed connecting rod 7 with one end of a lever 9 which has a stationary fulcrum pivot 27 intermediate its ends. The length of the connecting rod 7 is adjustable, thereby permitting adjustment of the tension on the filter bags 1.

The opposite free end of the lever 9 is formed for coaction with the lobes of a cam 10 mounted upon the shaft 24 which is supported in bearings in the stationary frame. The shaft 24 is rotatable by means of a driving element 19 and is preferably provided with a cam 10 corresponding to each of the several sets of bags.

The lever 9 is connected by means of an eye-bolt 21, an adjusting nut 20, and a helical spring 11, with an end of one of the arms of the bell crank 12. The bell crank 12 is pivoted on the stationary frame by means of a pivot 17 and is normally held against the stationary stop 14 by the bags 1 acting through the connecting rod 7, lever 9, eyebolt 21 and spring 11. The arm 15 of the bell crank 12 is connected with a projecting portion of the gate 6 by means of an adjustable connecting rod 16.

The shaft 25 which is mounted in bearings in the stationary frame, is provided with a plurality of cam members 13, one for each set of bags, which are slowly rotatable and engageable with projecting portions of the adjacent bell cranks 12. The cam members 13 are adjustable by means of set screws 22, 23, so as to alter the degree of engagement of the cam members with the bell cranks 12. The shaft 25 is slowly rotatable by means of a driving element 18 which coöperates with a driving element 26 secured to the shaft 24. In practice, the shaft 24 is preferably rotated at a much higher rate than that of the shaft 25, the approximate rate of the latter shaft being about one revolution every four or five minutes.

During the normal operation of the device and particularly during the dust collecting period, the dust laden air is drawn into the casing 2 by means of the suction fan, entering this casing through the inlet opening 3 and passing upwardly through the filter bags 1, the purified air being discharged from the casing 2 through the air discharge 4. During this period of collection, the cam member 13 is out of engagement with the bell crank 12 and the lobes of the cam 10 do not come in contact with the end of the lever 9. As the cam member 13 approaches the position disclosed in Figs. 3 and 4, the bell crank 12 is swung in an anticlockwise direction out of engagement with the stop 14 and into the position shown in Fig. 3. The movement of the bell crank 12 causes the same to act through the spring 11 and eyebolt 21 to swing the lever 9 in a similar direction. This movement of the lever 9 causes the end thereof to which the bags 1 are attached, to move upwardly, simultaneously causing the opposite free end to move downwardly into the circular path of the lobes of the cam 10. If the cam 10 at the time of this movement of the bell crank 12 is in the position shown in Fig. 3, the bags 1 will be suddenly stretched as indicated, placing the longitudinal threads thereof under tension. The bell crank 12 in moving away from the stop 14 also acts through the arm 15 and connecting rod 16 to swing the gate 6 from the position shown in Fig. 2 to that shown in Fig. 3, thereby cutting off communication to the fan and establishing communication directly between the interior of the casing 2 and the atmosphere. As the gate 6 assumes the position shown in Fig. 3, the suction or slightly reduced pressure created in the space beneath the bags 1 due to the flow of air into the adjacent compartments, causes a counter flow of air from the atmosphere into the casing 2, past the gate 6 and through the dust laden bags 1, thus tending to loosen the dust particles. As the cam 10 revolves it engages the adjacent free end of the lever 9 and successively gradually slackens the bags as disclosed in Fig. 4, and permits sudden restretching of the same by means of the spring 11, as disclosed in Fig. 3. This successive action on the filter bags 1 causes the dust to be effectively shaken from the interior surfaces thereof and to drop by gravity into the dust discharge opening 5 from which it may be withdrawn as desired.

It will be noted that by maintaining the bags in slackened condition during the collecting operation, the dust particles will not be permitted to lodge in the meshes of the fabric as in the devices of the prior art. The provision of a counter flow of air during the cleaning operation, together with the successive gradual slackening and sudden stretching of the bags during the cleaning operation, produces effective cleaning of the fabric preparatory to the following collecting operation.

It will be understood that it is not desired to be limited to the exact details of construction shown and described, for obvious modifications will occur to a person skilled in the art.

It is claimed and desired to secure by Letters Patent,—

1. The method of separating solids and gas which comprises, passing the mixture of solids and gas through a loosely suspended fabric filter, and removing the solids from said filter by periodically successively suddenly stretching and gradually reslackening said filter.

2. The method of separating solids and gas which comprises, passing the mixture of solids and gas through a loosely suspended fabric filter, periodically reversing the flow of gas through said filter, and successively suddenly stretching and gradually reslackening said filter during said period of reversed flow.

3. The method of separating dust from air which comprises, loosely suspending a fabric bag with its lower end open, passing the dust laden air successively through said lower open end and through the sides of said bag, periodically reversing the flow of air through said bag, and successively suddenly stretching and gradually reslackening said bag during said period of reversed flow.

4. In combination, a normally loosely suspended filter, means for inducing a flow of air through said filter, and means for periodically successively suddenly stretching and gradually reslackening said filter.

5. In combination, a normally loosely suspended filter, means for inducing a flow of air through said filter, means for periodically reversing the flow of air through said filter, and means for successively suddenly stretching and gradually reslackening said filter during said period of reversed flow.

6. In combination, a plurality of normally loosely suspended filter bags, means for inducing a flow of air through said bags, means for periodically simultaneously cutting off said flow and inducing a reverse flow through said bags, and means for successively suddenly stretching and gradually reslackening said bags during periods of reversed flow.

In testimony whereof, the signature of the inventor is affixed hereto.

RAY C. NEWHOUSE.